United States Patent

Nakamura

Patent Number: 5,033,860
Date of Patent: Jul. 23, 1991

[54] ROTARY KNEADING SCREW

[76] Inventor: Kensaku Nakamura, 272-1, Bessho-cho, Matsubara-shi, Osaka, Japan

[21] Appl. No.: 279,823

[22] Filed: Dec. 5, 1988

[30] Foreign Application Priority Data

May 12, 1988 [JP] Japan ................ 63-115400

[51] Int. Cl.⁵ ............................ B01F 7/08; B29B 7/14
[52] U.S. Cl. ......................................... 366/89; 366/90
[58] Field of Search .................. 366/79, 81, 89, 90, 366/88, 318, 323, 322, 324, 75, 82; 425/208, 209; 100/117, 145

[56] References Cited

U.S. PATENT DOCUMENTS

| | | |
|---|---|---|
| 3,184,790 | 5/1965 | Araki ........................ 366/81 |
| 3,652,064 | 3/1972 | Lehnen et al. ............. 366/90 X |
| 3,687,423 | 8/1972 | Koch et al. ................ 366/81 |
| 3,867,079 | 2/1975 | Kim ........................... 366/81 X |
| 3,900,188 | 8/1975 | Seufert ...................... 366/79 X |
| 3,924,839 | 12/1975 | Millauer .................... 366/81 |
| 3,941,535 | 3/1976 | Street ........................ 366/90 X |
| 3,992,500 | 11/1976 | Kruder et al. .............. 366/75 X |
| 4,015,832 | 4/1977 | Kruder ...................... 366/89 X |
| 4,131,368 | 12/1978 | Iddon ........................ 366/81 |
| 4,215,978 | 8/1980 | Takayama et al. ......... 366/89 X |
| 4,277,182 | 7/1981 | Kruder ...................... 366/89 |
| 4,334,785 | 6/1982 | Blach ........................ 366/79 |
| 4,444,507 | 4/1984 | Dray ......................... 366/81 |
| 4,525,073 | 6/1985 | Spinner ..................... 366/90 X |
| 4,639,143 | 1/1987 | Frankland, Jr. ........... 366/89 |
| 4,798,473 | 1/1989 | Rauwendaal .............. 366/89 |

*Primary Examiner*—Harvey C. Hornsby
*Assistant Examiner*—Scott J. Haugland
*Attorney, Agent, or Firm*—Moonray Kojima

[57] ABSTRACT

This invention relates to a rotary kneading screw installed in an extruder kneading and extrusion-molding a material mixture of a synthetic resin such as polyester resin mixed with one or more of master-batch, calcium carbonate, talc and carbon fiber. Progressively higher pressures are applied to the material mixture passing through a kneading section defined in the rotary screw. This rotary kneading screw is thus capable of kneading and extruding the material mixture in a large amount without deteriorating its physical properties and without lowering fluidity and molecular weight thereof even where the material mixture is difficult to knead.

2 Claims, 3 Drawing Sheets

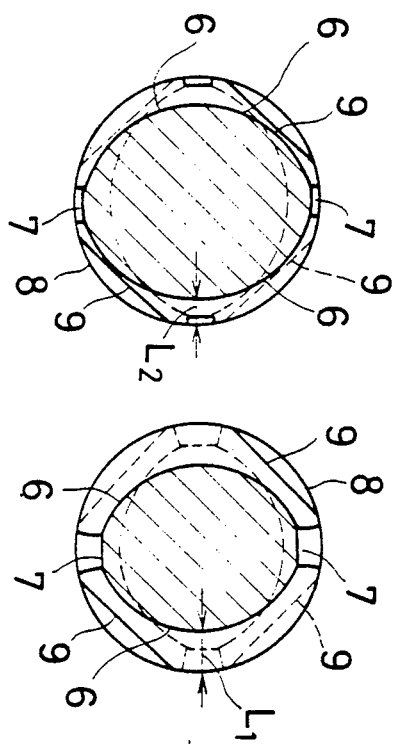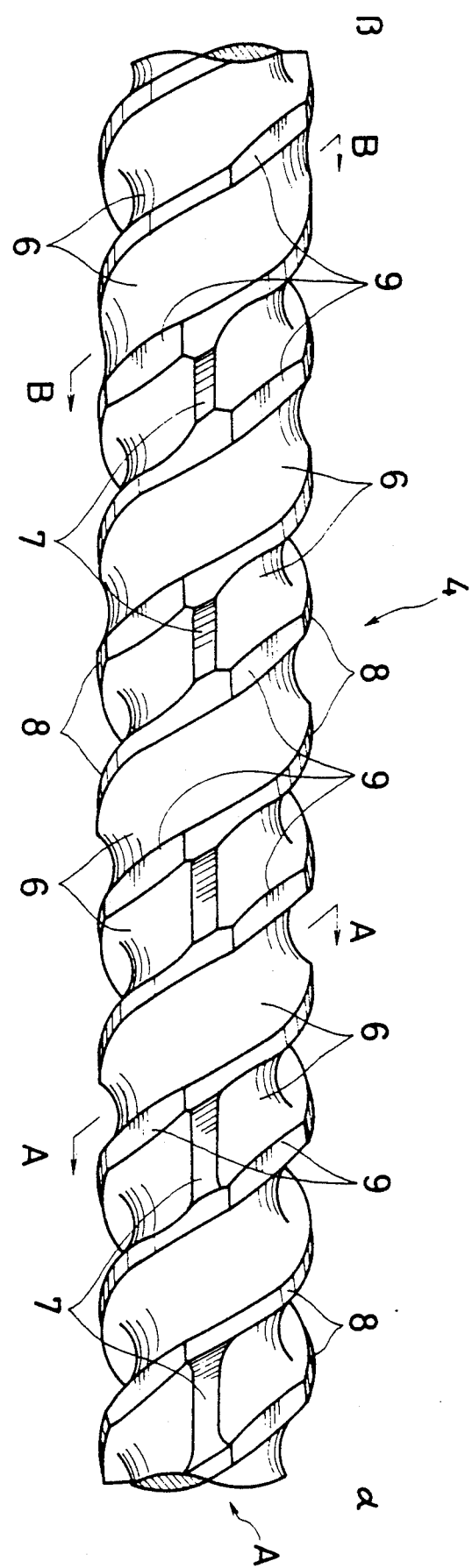

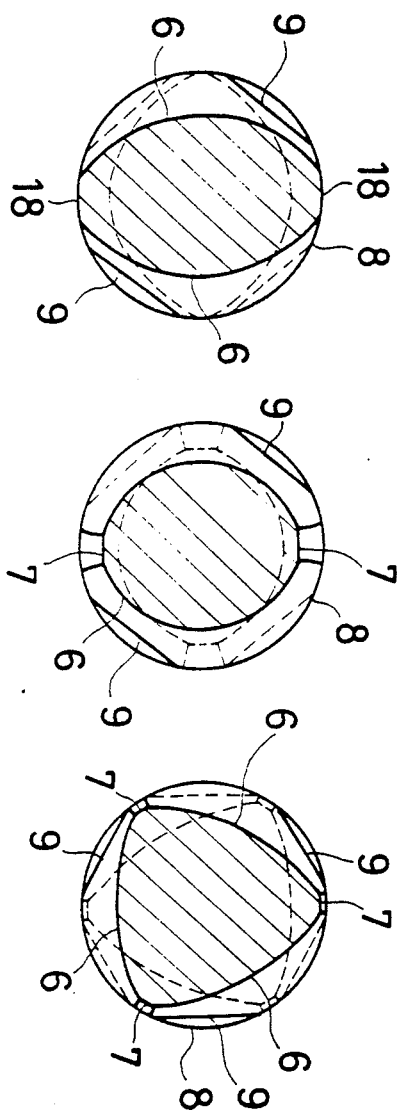
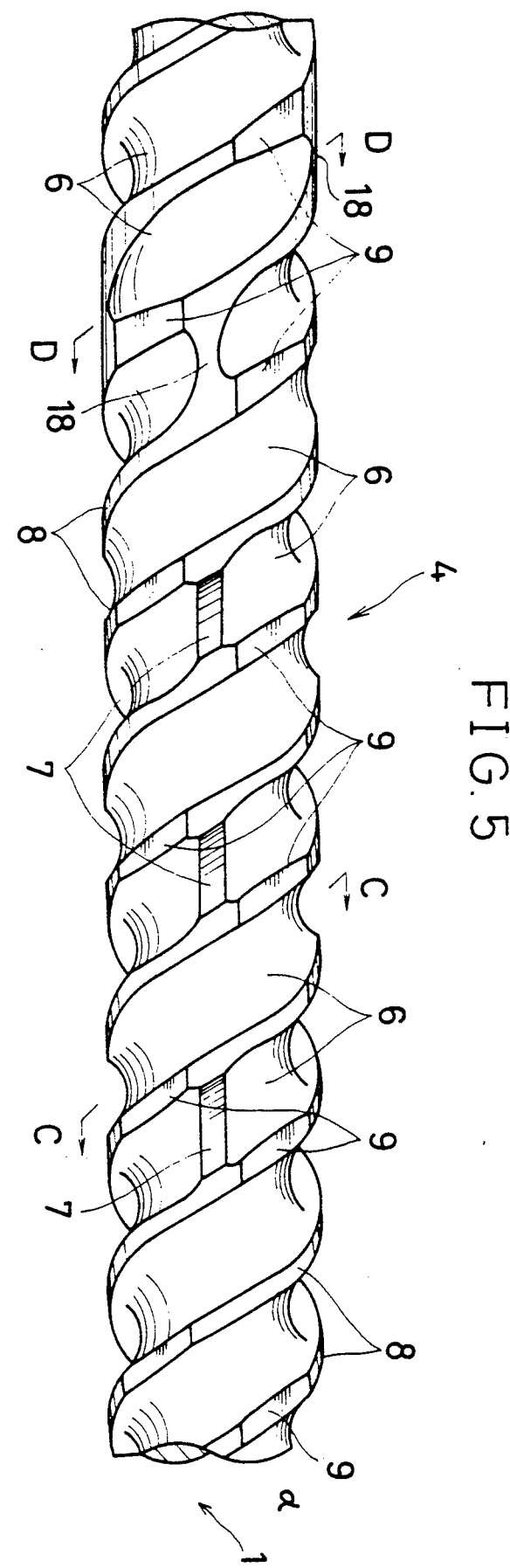

1

ROTARY KNEADING SCREW

SUMMARY OF THE INVENTION

This invention relates to a rotary kneading screw installed in an extruder for kneading and extrusion-molding a material mixture of a synthetic resin such as polyester resin and one or more of masterbatch, calcium carbonate, talc and carbon fiber. Progressively higher pressures are applied to the material mixture passing through a kneading section defined in the rotary screw. This rotary kneading screw is thus capable of kneading and extruding the material mixture in a large amount without deteriorating its physical properties and without allowing the material mixture to stagnate in or clog the kneading section even where the material mixture is difficult to knead.

BACKGROUND OF THE INVENTION

In order to provide an efficient kneading operation, a known rotary kneading screw used in an extruder has a kneading construction as disclosed in U.S. Pat. No. 4,639,143 for example. This rotary screw includes a kneading section forming a maximum outside diameter of the rotary screw. The kneading section defines a plurality of kneading recesses having a constant depth and shape along a material transport direction. A material mixture is kneaded in the course of transportation under a constant pressure.

The above rotary kneading screw, however, has a problem due to the application of a constant pressure to the material mixture passing through the kneading section. That is, when mixing and kneading a plurality of resins in pellet form, for example, the materials are heated by heaters or the like into a highly viscous half-melted state, and tend to adhere to inside surfaces of the kneading recesses during the transportation.

Further, if the resin materials stagnate and remain in low pressure regions of the kneading recesses, it becomes difficult to transport and uniformly knead the materials by means of the constant pressure. This results in the problem of extrusion-molding the materials without kneading the materials uniformly.

OBJECTS OF THE INVENTION

A primary object of this invention is to provide a rotary kneading screw capable of kneading a material mixture uniformly without deteriorating its fluidity and reducing its molecular weight, while preventing stagnation and clogging of the material mixture and improving physical properties thereof, and assuring an efficient kneading operation with high elongation and impact values. This object is achieved by defining a plurality of kneading recesses in a kneading section of the rotary kneading screw, which kneading recesses have progressively smaller depths from an introductive end to a terminal end of material transport.

Another object of this invention is to provide a rotary kneading screw which assures greatly improved physical properties of the material mixture, and provides still higher elongation and impact values through application of higher pressures to the material mixture. This object is achieved by defining a flow stopping portion between an adjacent pair of kneading recesses adjacent the terminal end of material transport, which flow stopping portion has the same height as a flight land in the kneading section, the flight land being cut to define a communicating passage.

Other objects of this invention will be apparent from the following description of the preferred embodiments.

BRIEF DESCRIPTION OF THE DRAWINGS

The drawings show embodiments of this invention, in which:

FIG. 2 is an enlarged side view of a kneading section of the rotary kneading screw, FIG. 3 is a section taken on line A—A of FIG. 2, FIG. 4 is a section taken on line B—B of FIG. 2, FIG. 5 is an enlarged view of a kneading section according to another embodiment, FIG. 6 is a section taken on line C—C of FIG. 5, FIG. 7 is a section taken on line D—D of FIG. 5, and FIG. 8 is a section taken in a helical direction showing a kneading recess according to a further embodiment.

DESCRIPTION OF THE PREFERRED EMBODIMENTS

Figure 1:
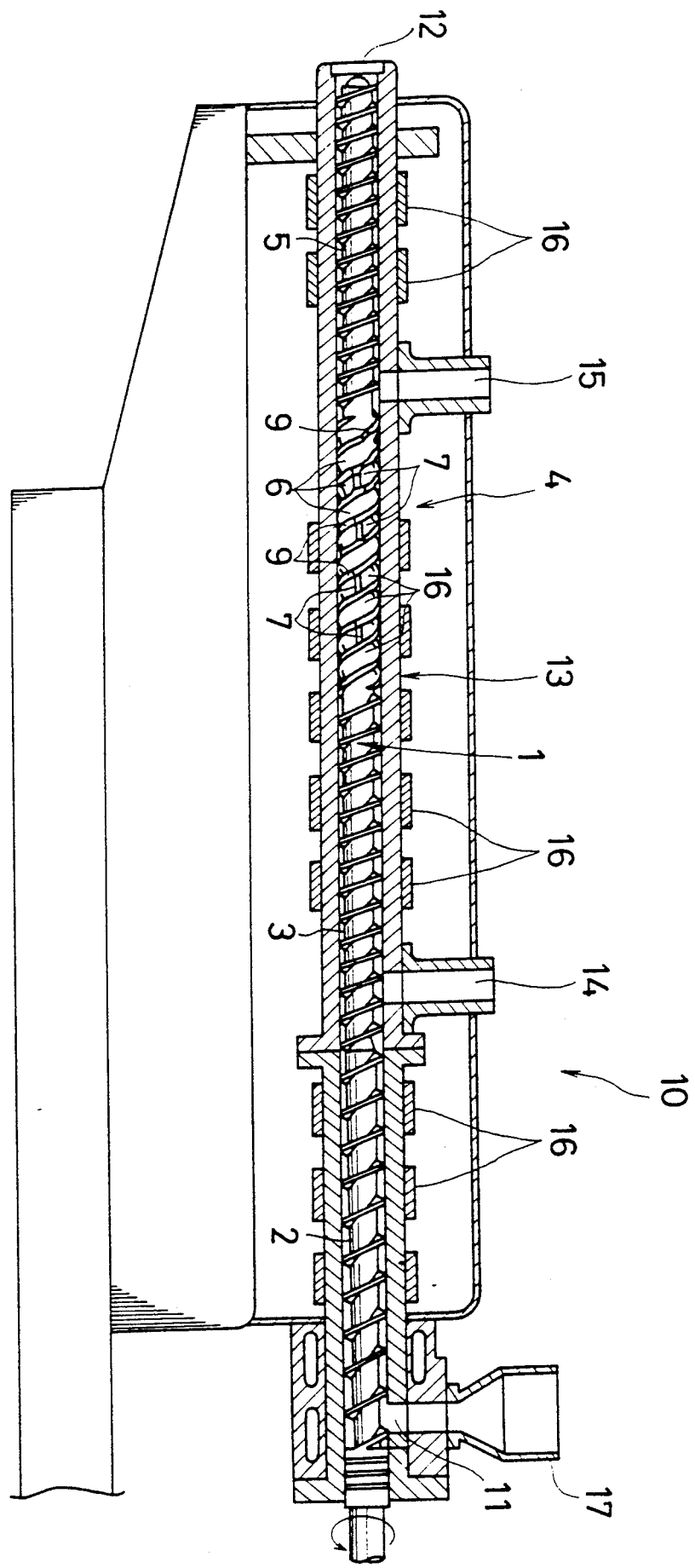
FIG. 1 is a sectional view of an extruder having a rotary kneading screw.

An embodiment of this invention will be described in detail hereinafter with reference to the drawings.

The drawings show the construction of a rotary kneading screw used in an extruder. Referring to FIG. 1, this rotary kneading screw 1 comprises a proximal portion (the righthand side in FIG. 1), an intermediate portion, a middle portion and a distal portion (the lefthand side in FIG. 1). The proximal portion defines a helical groove 2 extending in a material transport direction and having wide pitches and deep recesses. The intermediate portion defines a somewhat wide and deep helical groove 3. The middle portion defines a kneading section 4. The distal portion defines a narrow and shallow groove 5. The kneading section 4 includes a plurality of peripheral kneading recesses 6 extending in the helical direction.

As shown in FIG. 2, the kneading recesses 6 are defined peripherally of the kneading section 4 which forms a maximum outside diameter of the rotary kneading screw 1, such that the recesses 6 have progressively reducing depths in the helical direction from an introductive end $\alpha$ of the kneading section 4 to a terminal end $\beta$ thereof.

As shown in FIGS. 3 and 4, the kneading recesses 6 are cut, leaving a shaft of approximately elliptical sectional shapes.

That is, each of the above kneading recesses 6 defines a smooth arcuate recess extending in the helical direction, which recess is deepest at a middle position in the helical direction and becomes progressively shallower as it extends away in the helical direction from the deepest middle position. The depths at the middle positions of the respective kneading recesses 6 are progressively reduced from depth L1 adjacent the introductive end $\alpha$ of the kneading section 4 as shown in FIG. 3 to depth L2 adjacent the terminal end $\beta$ of the kneading section 4 as shown in FIG. 4.

Each of the kneading recesses 6 further defines a commnicating passage 7 leading to an adjacent kneading recess 6 for allowing a material mixture to flow in the helical direction. These communicating passages 7 have progressively reduced depths in the helical direction. Thus, as shown in FIG. 3, the communicating passages 7 adjacent the introductive end $\alpha$ of the kneading section 4 have depths for allowing the material mixture to flow in approximately the same amount as the middle positions of the kneading recesses 6. On the other hand, as shown in FIG. 4, the communicating passages 7 adjacent the terminal end β have depths for allowing the material mixture to flow only in small amounts.

Further, a communicating passage 9 is defined by cutting part of a flight land 8 between an axially adjacent pair of kneading recesses 6 to allow flow of the material mixture.

Reverting to FIG. 1, the rotary kneading screw 1 is used in an extruder 10 which comprises a feed inlet 11 at a proximal end thereof for feeding materials. The rotary kneading screw 1 is rotatably supported inside a heating cylinder 13 defining an extruding opening 12 at a distal end thereof. The heating cylinder 13 further defines gas exhaust vents 14 and 15 at upper surfaces of a proximal and a distal portions thereof. A plurality of band heaters 16 are arranged at intervals along the outer periphery of the cylinder 13 for heating and melting the materials. Further, a hopper 17 is mounted in communication with the feed inlet 11 for supplying the materials.

The rotary kneading screw 1 is connected to drive means such as a drive motor (not shown) to be driven for rotation in a material transport direction indicated by an arrow.

How the illustrated embodiment operates will be described next.

Referring to FIG. 1, when a material mixture of polyester resin with masterbatch, titanium or calcium carbonate, for example, is supplied into the hopper 17 of the extruder 10, the material mixture in the hopper 17 is subjected to a transporting action of the rotary kneading screw 1 rotating in the material transport direction indicated by the arrow. In this state the material mixture is successively transported in constant amounts into the heating cylinder 13 and toward the extruding opening 12.

During the transport, the material mixture is heated and melted by the band heaters 16 and degassed through the vent 14. Thereafter the material mixture is transported onward while being kneaded, moving into and out of the kneading recesses 6 defined in the kneading section 4.

More particularly, the material mixture flows into the deep kneading recesses 6 defined adjacent the introductive end α of the kneading section 4, and part of the material mixture is then divided out to flow into shallower, helically adjacent kneading recesses 6 through the communicating passages 7 to be agitated and kneaded. The remaining material mixture is transported over peripheral walls of the kneading recesses 6 into the shallower kneading recesses 6 adjacent thereto in the helical and axial direction, and joins the material mixture flowing from the other kneading recesses 6.

As the material mixture flows successively from deeper kneading recesses 6 to shallower kneading recesses 6, the material storage capacity gradually decreases to limit the amount of material flow. On the other hand, increasing amounts of the material mixture is forced into the shallower kneading recesses 6. As a result, progressively higher pressures act on the incoming material mixture, thereby forcibly transporting the highly viscous material mixture which would otherwise tend to stagnate in or adhere to wall surfaces of the kneading recesses 6.

At the same time, while gradually increasing the flow speed of the material mixture, the amount of material flow is limited by the communicating passages 7 and flight lands 8, thereby applying progressively stronger thrusting forces. Further, turbulent pulsations are positively applied to the material mixture in transportation as a result of pulsations due to pressure variations occurring when the material mixture flows into the middle position of each kneading recess 6 and of turbulence due to the foregoing flow divisions. The material mixture is thereby kneaded uniformly and is shaped by being successively extruded through the extruding opening 12.

The gas generated from the kneaded material during this process is exhausted through the vent 15 adjacent the distal end.

The material mixture is caused to flow into the kneading recesses 6 of the kneading section 4 having progressively smaller depths, and progressively greater pressures are applied to the material mixture passing through the kneading section 4 as described above. Thus, even a material difficult to fully melt and knead with masterbatch, talc, calcium carbonate, or carbon fiber resin, is kneaded and transported forcibly and reliably, thereby positively preventing stagnation and clogging of the material mixture inside the kneading recesses 6 and assuring a large amount of extrusion.

Moreover, the high pressure and the limitation to the amount of flow occurring during the passage through the kneading section 4 produce the effect of increasing the flow speed of the material mixture and positively agitating and kneading the material mixture. The extruded material mixture has excellent physical properties, particularly with no deterioration in its fluidity and no reduction in the molecular weight, and with high elongation and impact values.

A highly efficient kneading operation may be achieved to suit the extent to which a given material mixture should be kneaded, only by varying the number of kneading recesses 6 and the gradient of progressively shallower kneading recesses 6 from the introductive end α to the terminal end β. Thus the rotary kneading screw 1 suited to a particular material mixture may be manufactured with ease and at low cost.

FIGS. 5 through 7 show a kneading section 4 according to another embodiment. In this embodiment, the kneading section 4 of the rotary kneading screw 1 defines kneading recesses 6 having progressively smaller depths from the introductive end α to the terminal end β of the kneading section 4. The kneading recesses 6 adjacent the terminal end β define flow stopping portions 18 at boundaries therebetween in the helical direction, instead of the communicating passages 7 as in the foregoing embodiment, which flow stopping portions 18 are at the same height as the flight lands 8 of the kneading section 4.

According to this construction, the material mixture flowing into the kneading recesses 6 adjacent the terminal end is prevented by the flow stopping portions 18 from flowing helically. Thus, the material mixture is subjected to higher pressures than in the foregoing embodiment. This embodiment, therefore, is most suitable for kneading a material such as glass fiber or titanium which is difficult to knead with a resin, and is capable of kneading such a material mixture uniformly.

In the other aspects, this embodiment has the same function and effect as the foregoing embodiment. Like numerals and references are affixed in FIGS. 5 through 7 to like components as shown in FIGS. 2 through 4, and their detailed description is omitted here.

As shown in FIG. 8, the kneading recesses 6 may be defined in the kneading section 4 of the rotary kneading screw 1 such that the shaft of the kneading section 4 has an approximately triangular or rectangular helical section resembling a trochoidal curve.

What is claimed is:

1. A rotary kneading screw structure comprising a shaft having an introductive end and a terminal end; and a plurality of helically disposed flight lands extending radially outward from said shaft and defining therebetween a plurality of kneading recesses, said kneading recesses being of smooth arcuate shape extending in the helical direction with each recess having a deepest part disposed at a middle position of the recess in the helical direction and becoming progressively shallower in depth as it extends away in the helical direction from said deepest part, said kneading recesses also having the deepest parts of progressively shallower depths from said introductive end to said terminal end, said kneading screw structure having first channel shaped communicating passages disposed in the axial direction connecting adjacent kneading recesses, said first channel shaped communicating passages having progressively shallower depths from said introductive end to said terminal end, said flight lands defining second communicating passages disposed between adjacent pairs of kneading recesses, said second communicating passages being defined by a straight line cut through a peripheral segment of the flight lands.

2. A rotary kneading screw structure comprising a shaft having an introductive end and a terminal end; and a plurality of helically disposed flight lands extending radially outward from said shaft and defining therebetween a plurality of kneading recesses, said kneading recesses being of smooth arcuate shape extending in the helical direction with each recess having a deepest part disposed at a middle position of the recess in the helical direction and becoming progressively shallower in depth as it extends away in the helical direction from said deepest part, said kneading recesses also having the deepest parts of progressively shallower depths from said introductive end to said terminal end, said kneading screw structure having first channel shaped communicating passages disposed in the axial direction connecting adjacent kneading recesses, said first channel shaped communicating passages having progressively shallower depths from said introductive end to said terminal end, said flight lands defining second communicating passages disposed between adjacent pairs of kneading recesses, said second communicating passages being defined by a straight line cut through a peripheral segment of the flight lands, said kneading recess closest to said terminal end having a flow stopping portion extending between two adjacent flight lands and being of the same as the two adjacent flight lands and located at about the same area axially relative to said closest kneading recess as said first communicating passages are located in the other kneading recesses.

* * * * *